(12) United States Patent
Chung et al.

(10) Patent No.: US 10,495,910 B1
(45) Date of Patent: Dec. 3, 2019

(54) DISPLAY DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Cheng-Fa Chung, New Taipei (TW); Kui-Jun Zhang, Shenzhen (CN); Lei Liang, Guangdong (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/021,283

(22) Filed: Jun. 28, 2018

(30) Foreign Application Priority Data

Jun. 6, 2018 (CN) .......................... 2018 1 0576408

(51) Int. Cl.
*H05K 7/02* (2006.01)
*H05K 7/04* (2006.01)
*G02F 1/1333* (2006.01)
*G02F 1/13357* (2006.01)

(52) U.S. Cl.
CPC ...... *G02F 1/133308* (2013.01); *G02F 1/1336* (2013.01); *G02F 2001/133314* (2013.01); *G02F 2001/133317* (2013.01); *G02F 2001/133325* (2013.01); *G02F 2001/133328* (2013.01)

(58) Field of Classification Search
USPC ......................................... 361/807, 809, 810
See application file for complete search history.

(56) References Cited

U.S. PATENT DOCUMENTS

| | | | |
|---|---|---|---|
| 8,199,488 B2* | 6/2012 | Zou ........................... | B32B 3/02 312/223.1 |
| 2005/0185424 A1* | 8/2005 | Tsai ...................... | G02B 6/0031 362/632 |
| 2015/0201763 A1* | 7/2015 | Choi .................... | G09F 13/0413 40/716 |
| 2015/0277179 A1* | 10/2015 | Nishi ................... | G02B 6/0088 349/58 |

FOREIGN PATENT DOCUMENTS

TW 200728867 A 8/2007
TW 200736698 A 10/2007

* cited by examiner

*Primary Examiner* — Hung S. Bui
(74) *Attorney, Agent, or Firm* — ScienBiziP, P.C.

(57) ABSTRACT

A display device which can be put together without hooks or fasteners includes an outer frame and a backplane. The outer frame includes a side frame and a T-shaped fixture block protruding from the side frame. The backplane includes a side board. A T-shaped groove is formed on the side board. The T-shaped groove extends through the side board. The T-shaped groove includes a first groove and an inwardly extending groove communicating with the first groove. The fixture block can be inserted into or removed from the first groove. The fixture block can be moved along the inwardly extending groove to engage with the two sides of the inwardly extending groove.

13 Claims, 5 Drawing Sheets

DISPLAY DEVICE

FIELD

The subject matter generally relates to structure of a display device.

BACKGROUND

A television includes a display screen and a back plate. The display screen and the back plate may be connected by deformable hooks or screw locks. However, such hooks on the outer frame may easily break during assembly and disassembly, and the hooks on the outer frame need to be replaced when they are broken. Moreover, broken screw locks may fall inside the interior of the television, where they can cause damage to the television.

Thus, there is room for improvement in the art.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
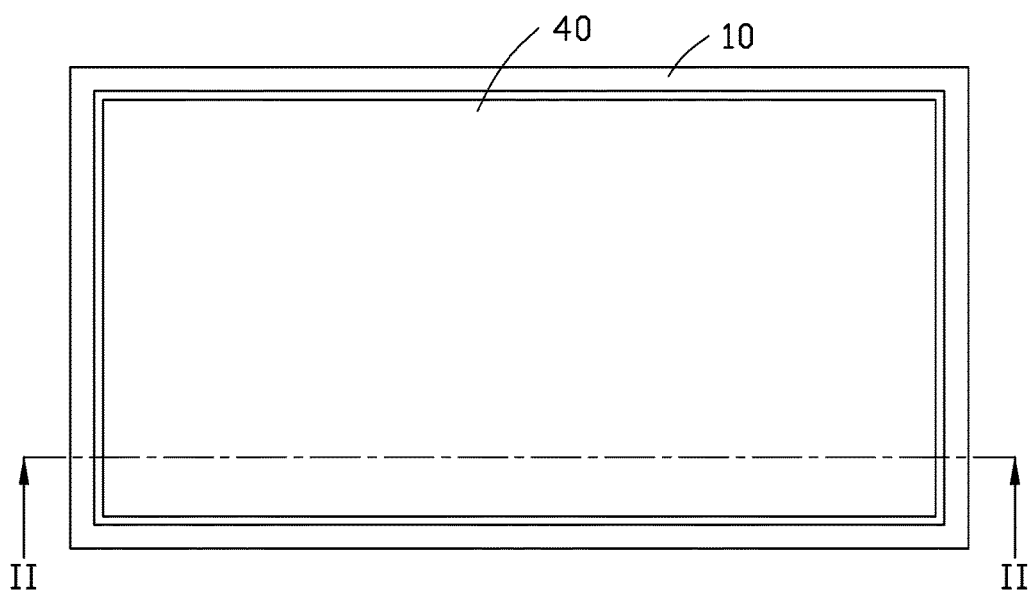
FIG. 1 is a top plan view of a first embodiment of a display device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIGS. 1-5 illustrate an embodiment of a display device 100. The display device 100 includes an outer frame 10, a backplane 20, a middle frame 30, a display screen 40, and an optical module 50. The outer frame 10 and the backplane 20 are to be connected together. The middle frame 30 is formed on the backplane 20. The display screen 40 is formed on the middle frame 30. The optical module 50 is formed on the backplane 20 and faces the display screen 40.

The outer frame 10 includes an inwardly extending frame 11 and a side frame 12 connected to the inwardly extending frame 11. The inwardly extending frame 11 is perpendicular to the side frame 12.

In at least one embodiment, the inwardly extending frame 11 and the side frame 12 are integrally formed together. In another embodiment, the side frame 12 can be connected to the inwardly extending frame 11 by screws or adhesive.

The side frame 12 includes a side surface 121, the side surface 121 is perpendicular to the inwardly extending frame 11.

The outer frame 10 further includes a fixture block 13. The fixture block 13 is formed on the side surface 121 of the side frame 12.

The fixture block 13 is substantially T-shaped. The fixture block 13 includes a first fixture portion 131 and a second fixture portion 132. The second fixture portion 132 is perpendicular to the first fixture portion 131. The first fixture portion 131 is formed on the side surface 121. The second fixture portion 132 is parallel to the side surface 121.

In at least one embodiment, the first fixture portion 131 and the second fixture portion 132 are integrally formed together. In another embodiment, the second fixture portion 132 can be connected to the first fixture portion 131 by screws or adhesive.

The backplane 20 includes a main board 21 and a side board 22. The side board 22 is perpendicular to the main board 21.

In at least one embodiment, the main board 21 and the side board 22 are integrally formed together. In another embodiment, the side board 22 can be connected to the main board 21 by screws or adhesive.

The main board 21 is perpendicular to the side frame 12. The side board 22 is parallel to the side frame 12.

The backplane 20 further includes a T-shaped groove 23. The T-shaped groove 23 extends through the side board 22. The T-shaped groove 23 is substantially T-shaped. The T-shaped groove 23 includes a first groove 231 and an inwardly extending groove 232. The second groove 232 is perpendicular to the first groove 231. The second groove 232 communicates with the first groove 231. The first groove 231 and the second fixture portion 132 extend in the same direction.

The first groove 231 has a length/width that is greater than or equal to a length/width of the second fixture portion 132. In at least one embodiment, the length/width of the first groove 231 is slightly greater than the length/width of the second fixture portion 132.

The inwardly extending groove 232 has a width that is greater than or equal to a thickness of the first fixture portion 131. The width of the inwardly extending groove 232 is less than a length of the second fixture portion 132. In at least one embodiment, the width of the inwardly extending groove 232 is slightly greater than the width of the first fixture portion 131. The width of the inwardly extending groove 232 is less than a length of the second fixture portion 132. The second fixture portion 132 can enter into the first groove 231. The first fixture portion 131 can be moved while in the inwardly extending groove 232.

When the second fixture portion 132 is moved to the end of the inwardly extending groove 232 that is spaced furthest away from the first groove 231, the second fixture portion 132 engages with the two sides of the inwardly extending groove 232. Thereby, the side board 22 and the side frame 12 can be connected together.

When the second fixture portion 132 is moved to the first groove 231, the first fixture portion 131 and the second fixture portion 132 can be taken out of the first groove 231. Thereby, the side board 22 and the side frame 12 can be disassembled.

The first fixture portion 131 has a length that is greater than or equal to a thickness of the side board 22. In at least one embodiment, the length of the first fixture portion 131 is slightly greater than the thickness of the side board 22.

The middle frame 30 is formed on the main board 21. The middle frame 30 is parallel to the side board 22.

The display screen 40 is formed on the end of the middle frame 30 that is spaced furthest away from the main board 21.

The display screen 40 includes a display surface 41. The display surface 41 is spaced furthest away from the main board 21. The display surface 41 contacts the inwardly extending frame 11.

Figure 2:
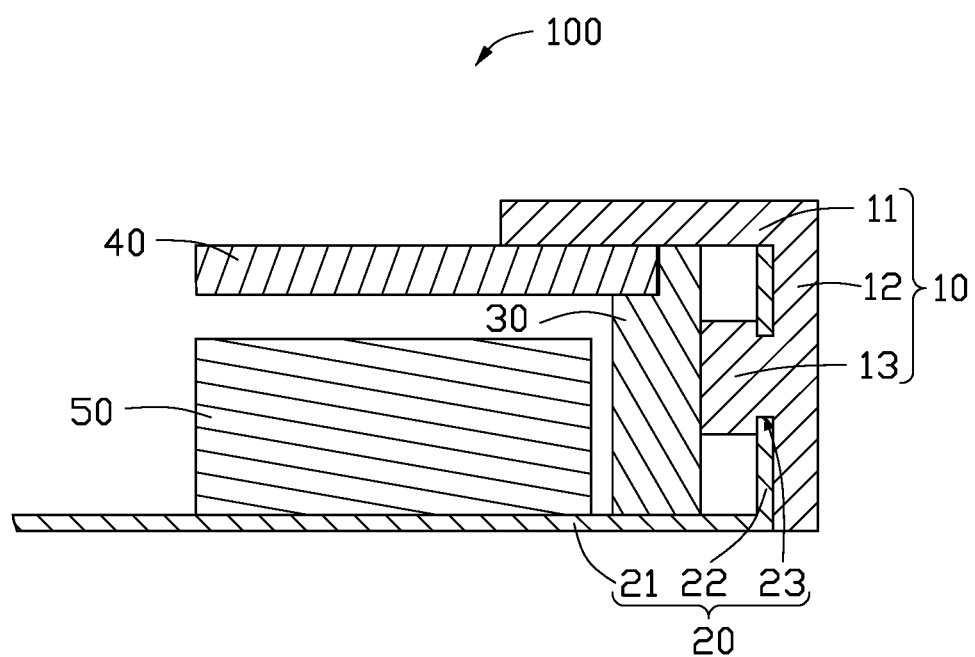
FIG. 2 is a cross-sectional view of the display device along line II-II of FIG. 1.
Figure 3:
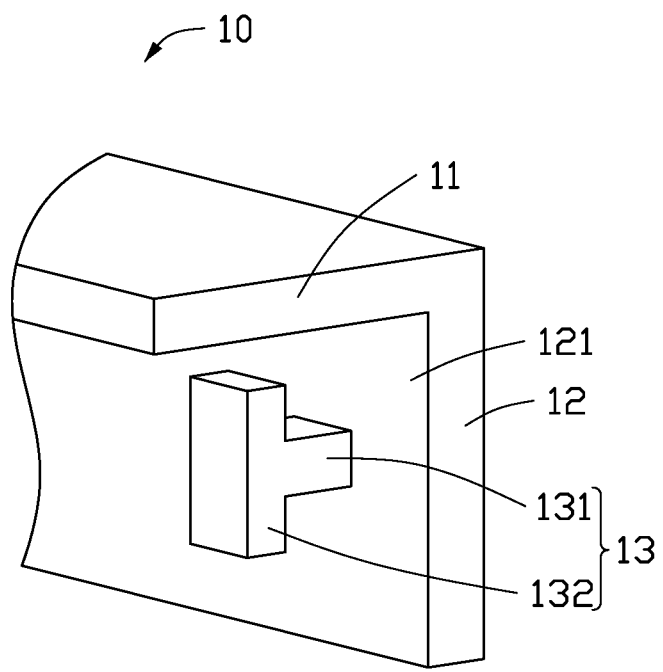
FIG. 3 is a perspective view of an outer frame of the display device of FIG. 2.
Figure 4:
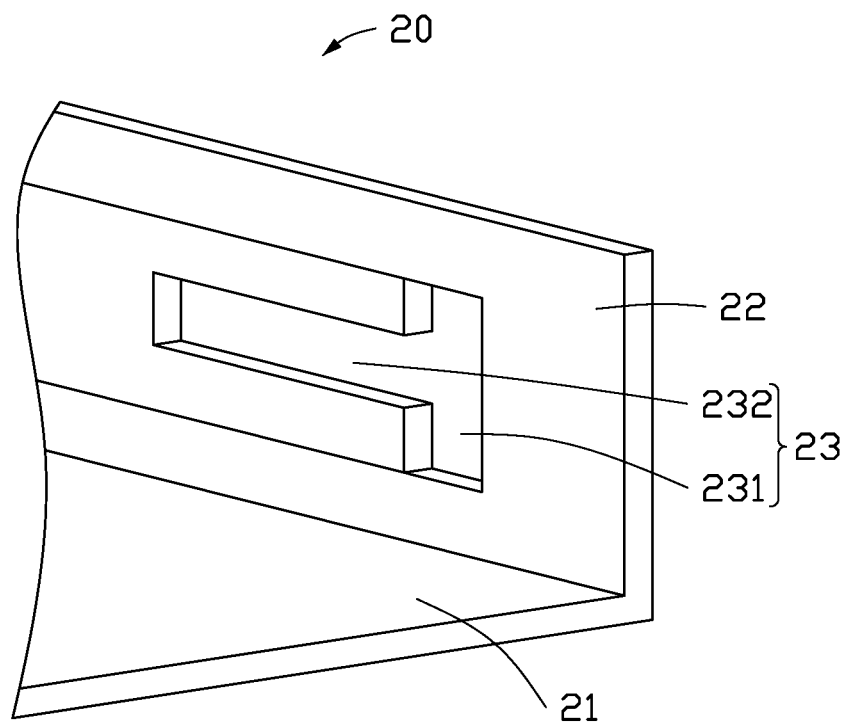
FIG. 4 is a perspective view of a backplane of the display device of FIG. 2.
Figure 5:
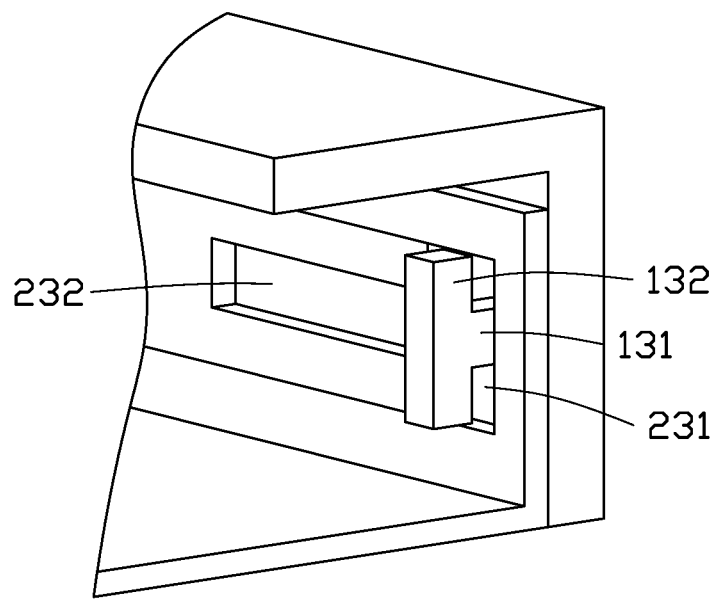
FIG. 5 is a perspective view of the outer frame of FIG. 3 being assembled to the backplane of FIG. 4.

In another embodiment, the middle frame 30 in FIG. 2 can be omitted from the display device 100. The display screen 40 can then be formed on the inwardly extending frame 11.

The display screen 40 can be a liquid crystal display or a plasma panel. In at least one embodiment, the display screen 40 is a liquid crystal display.

The optical module 50 provides light to illuminate the display screen 40.

The optical module 50 is fixed on the main board 21 and faces the display screen 40.

The middle frame 30 is located between the optical module 50 and the side board 22.

In at least one embodiment, assembly of the display device 100 includes one or more of the following steps. Firstly, the outer frame 10 is placed above the backplane 20 and driven to the side frame 12 to allow inserting the fixture block 13 in the T-shaped groove 23. The outer frame 10 is moved to the end of the inwardly extending groove 232 that is spaced furthest away from the first groove 231, the second fixture portion 132 engages the two sides of the inwardly extending groove 232. Thereby, the side board 22 and the side frame 12 can be connected together. Secondly, the middle frame 30 and the optical module 50 are formed on the main board 21. The display screen 40 is formed on the middle frame 30.

In another embodiment, assembly of the display device 100 includes one or more of the following steps. Firstly, the middle frame 30 and the optical module 50 are formed on the main board 21. The display screen 40 is formed on the middle frame 30. Secondly, the outer frame 10 is placed above the backplane 20 and driven to the side frame 12 to allow inserting the fixture block 13 into the T-shaped groove 23, then the outer frame 10 is moved to the end of the inwardly extending groove 232 that is spaced furthest away from the first groove 231, the second fixture portion 132 engages the two sides of the inwardly extending groove 232. Thereby, the side board 22 and the side frame 12 can be connected together.

Disassembly of the display device 100 includes one or more of the following steps. Firstly, the outer frame 10 is pushed until the fixture block 13 is released from the inwardly extending groove 232 and enters into the first groove 231. Secondly, the outer frame 10 is pulled away from the side board 22 until the fixture block 13 clears the first groove 231.

With the above configuration, the display device 100 can be assembled and disassembled easily, so the assembly and disassembly of the display device 100 can be done quickly and without tools. The display device 10 prevents opportunities for debris from being introduced inside the interior of the television.

The embodiments shown and described above are only examples. Many details are often found in the art such as the other features of the display device. Therefore, many such details are neither shown nor described. Even though numerous characteristics and advantages of the present technology have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A display device comprising:
    an outer frame, the outer frame comprising a side frame and a T-shaped fixture block protruding from the side frame;
    a backplane, the backplane comprising a main board and a side board perpendicular to the main board, a T-shaped groove being formed on the side board, the T-shaped groove extending through the side board, the T-shaped groove comprising a first groove and an inwardly extending groove communicating with the first groove; wherein the fixture block can be inserted into or removed from the first groove, the fixture block can be moved along the inwardly extending groove to engage with the two sides of the inwardly extending groove; wherein, the fixture block comprises a first fixture portion and a second fixture portion perpendicular to the first fixture portion, the first fixture portion is formed on the side frame, the second fixture portion is parallel to the side frame; and
    a middle frame formed on the main board; wherein during assembly, the first fixture portion is received in the inwardly extending groove, and the second fixture portion is engaged with the two sides of the inwardly extending groove and touches the middle frame.

2. The display device of claim 1, wherein the inwardly extending groove is perpendicular to the first groove.

3. The display device of claim 1, wherein the first groove and the second fixture portion extend in the same direction.

4. The display device of claim 1, wherein the first groove has a length/width that is greater than or equal to a length/width of the second fixture portion.

5. The display device of claim 1, wherein the inwardly extending groove has a width that is greater than or equal to a thickness of the first fixture portion.

6. The display device of claim 5, wherein the width of the inwardly extending groove is less than a length of the second fixture portion.

7. The display device of claim 1, wherein the first fixture portion has a length that is greater than or equal to a thickness of the side board.

8. The display device of claim 1, wherein the outer frame further comprises an inwardly extending frame, the inwardly extending frame is perpendicular to the side frame.

9. The display device of claim 8, wherein the display device further comprises a display screen, the display screen comprises a display surface; the display surface contacts the inwardly extending frame.

10. The display device of claim 9, wherein the display surface is spaced furthest away from the main board.

11. The display device of claim 10, wherein the display screen is formed on the end of the middle frame that is spaced furthest away from the main board.

12. The display device of claim 11, wherein the display device further comprises an optical module, the optical module is formed on the main board and faces the display screen.

13. The display device of claim 12, wherein the middle frame is located between the optical module and the side board.

\* \* \* \* \*